United States Patent
Becker et al.

(10) Patent No.: US 8,667,990 B2
(45) Date of Patent: Mar. 11, 2014

(54) HYDRAULIC OSCILLATING MOTOR

(75) Inventors: Michael Becker, Leonberg/Warmbronn (DE); Reinhard Horn, Rutesheim (DE)

(73) Assignee: Dr. Ing. H.C.F. Porsche Aktiengesellschaft, Stuttgart (DE)

( * ) Notice: Subject to any disclaimer, the term of this patent is extended or adjusted under 35 U.S.C. 154(b) by 908 days.

(21) Appl. No.: 12/830,886

(22) Filed: Jul. 6, 2010

(65) Prior Publication Data

US 2011/0000565 A1  Jan. 6, 2011

Related U.S. Application Data

(60) Provisional application No. 61/226,057, filed on Jul. 16, 2009.

(30) Foreign Application Priority Data

Jul. 3, 2009  (DE) .......................... 10 2009 032 212

(51) Int. Cl.
*F16L 55/04* (2006.01)
*F16D 31/02* (2006.01)
*F16K 31/12* (2006.01)

(52) U.S. Cl.
USPC .................. 138/31; 138/26; 60/416; 60/469; 251/59

(58) Field of Classification Search
USPC ........... 138/26, 30, 31; 303/10, 11, 116.4, 87; 60/416, 371, 469; 251/59; 91/61; 477/150

See application file for complete search history.

(56) References Cited

U.S. PATENT DOCUMENTS

| | | | | |
|---|---|---|---|---|
| 2,417,256 A | * | 3/1947 | Kremiller | 138/31 |
| 2,789,581 A | * | 4/1957 | Kerr | 138/31 |
| 3,681,918 A | * | 8/1972 | Chanin | 60/415 |
| 3,752,041 A | | 8/1973 | Smith | |
| 3,850,195 A | * | 11/1974 | Olsson | 137/503 |
| 3,918,498 A | * | 11/1975 | Schneider | 138/31 |
| 4,103,700 A | * | 8/1978 | Orrell et al. | 137/172 |
| 4,382,483 A | * | 5/1983 | Spencer | 180/433 |
| 4,538,972 A | * | 9/1985 | Gooden | 417/540 |
| 4,915,186 A | * | 4/1990 | Gage | 180/403 |
| 5,018,547 A | * | 5/1991 | Alcorn | 137/111 |
| 5,301,783 A | * | 4/1994 | Malloy | 192/85.63 |

(Continued)

FOREIGN PATENT DOCUMENTS

DE  19533864 C1  4/1997
DE  10140460 C1  3/2003

(Continued)

*Primary Examiner* — Paul R Durand
*Assistant Examiner* — Matthew Lembo
(74) *Attorney, Agent, or Firm* — Leydig, Voit & Mayer, Ltd.

(57) ABSTRACT

A hydraulic oscillating motor which has at least two working chambers which are coupled via pressure lines to a device for pressure compensation. A first working chamber is connected to a first pressure line and a second working chamber is connected to a second pressure line. The motor further has a device for pressure compensation with a first compensating cylinder and a second compensating cylinder. Each of the compensating cylinders has in each case one compensating volume and in each case one elastic force store for delimiting the respective compensating volume. The compensating volume of the first compensating cylinder is connected to the first pressure line, and the compensating volume of the second compensating cylinder is connected to the second pressure line.

12 Claims, 5 Drawing Sheets

(56) References Cited

U.S. PATENT DOCUMENTS

| | | | |
|---|---|---|---|
| 5,354,187 A * | 10/1994 | Holland et al. | 417/540 |
| 5,971,027 A * | 10/1999 | Beachley et al. | 138/31 |
| 6,390,133 B1 | 5/2002 | Patterson et al. | |
| 6,412,476 B1 * | 7/2002 | Thompson et al. | 123/516 |
| 7,308,910 B2 * | 12/2007 | Weber | 138/31 |
| 7,661,442 B2 * | 2/2010 | O'Brien et al. | 138/31 |
| 7,866,253 B2 * | 1/2011 | Bottger et al. | 92/120 |
| 2007/0108707 A1 | 5/2007 | Kobayashi | |
| 2008/0185796 A1 | 8/2008 | Bottger et al. | |

FOREIGN PATENT DOCUMENTS

| | | |
|---|---|---|
| DE | 102007005839 A1 | 8/2008 |
| JP | 9183306 A | 7/1997 |
| JP | 11055805 A | 2/1999 |
| JP | 2001328526 A | 11/2001 |
| JP | 2002000006 U | 1/2002 |
| JP | 2005240934 A | 9/2005 |
| JP | 2006077908 A | 3/2006 |
| JP | 2007137153 A | 6/2007 |

* cited by examiner

HYDRAULIC OSCILLATING MOTOR

CROSS-REFERENCE TO RELATED APPLICATION

This application claims the priority, under 35 U.S.C. §119, of German application DE 10 2009 032 212.4, filed Jul. 3, 2009; this application also claims priority under 35 U.S.C. §119(e), of provisional application No. 61/226,057 filed Jul. 16, 2009; the prior applications are herewith incorporated by reference in their entirety.

BACKGROUND OF THE INVENTION

Field of the Invention

The invention relates to a hydraulic oscillating motor which has at least two working chambers which are coupled via pressure lines to a device for pressure compensation, with a first working chamber being connected to a first pressure line and with a second working chamber being connected to a second pressure line.

German patent DE 195 33 864 C1 discloses a hydraulic oscillating motor for a split stabilizer on an axle of a two-track motor vehicle. The oscillating motor has a motor shaft which has vanes, a working chamber of the oscillating motor being divided into individual working chambers, and at least first and second hydraulic ports for at least two separate working chambers. If appropriate a connecting system is provided between the working chambers, which connecting system hydraulically connects the working chambers at least in pairs, with the arrangement of the connected working chambers being configured such that those working chambers which are assigned to the first hydraulic port alternate with working chambers which are assigned to the second hydraulic port.

In hydraulic oscillating motors which are used in the chassis of a motor vehicle, the fast and sometimes sudden movement of the oscillating motor can result in the occurrence of cavitation, that is to say the formation and explosion of cavities in the hydraulic fluid as a result of pressure fluctuations. Cavitation can lead to clearly audible noises which can be perceived as being disturbing by the occupants of the motor vehicle. To prevent cavitation, it is proposed in German patent DE 101 40 460 C1 that the working chambers of a hydraulic oscillating motor be connected to the environment via in each case one check valve device which blocks a discharge of air from the working chamber. In this way, it is sought to prevent the occurrence of cavitation by sucking in air from the environment.

It has been found that the introduction of air into the hydraulic system, in particular during high-power operation of the motor vehicle, can have an extreme adverse effect on the stiffness and the reaction capability of the hydraulic system. During longer periods of operation, the seals in the hydraulic system can also be adversely affected. Furthermore, during the introduction of air, it is also not possible in an adequately reliable manner to prevent an undesired introduction of moisture and/or dirt into the hydraulic system.

SUMMARY OF THE INVENTION

It is accordingly an object of the invention to provide a hydraulic oscillating motor which overcomes the above-mentioned disadvantages of the prior art methods and devices of this general type, in which undesired cavitations can be prevented more reliably than before, in particular also when the motor vehicle is used in the high-power range.

With the foregoing and other objects in view there is provided, in accordance with the invention a hydraulic oscillating motor. The hydraulic oscillating motor has pressure lines including a first pressure line and a second pressure line, and a device for pressure compensation having a first compensating cylinder and a second compensating cylinder. Each of the first and second compensating cylinders have one compensating volume and one elastic force store for delimiting a respective compensating volume. The compensating volume of the first compensating cylinder is connected to the first pressure line and the compensating volume of the second compensating cylinder is connected to the second pressure line. At least two working chambers are coupled via the pressure lines to the device for pressure compensation. The at least two working chambers include a first working chamber connected to the first pressure line and a second working chamber connected to the second pressure line.

A hydraulic oscillating motor of the type specified in the introduction is equipped, according to the invention, with a device for pressure compensation which has a first and a second compensating cylinder, with each of these compensating cylinders having in each case one compensating volume and in each case one elastic force store for delimiting the compensating volume assigned to the respective force store. The compensating volume of the first compensating cylinder is connected to the first pressure line, and the compensating volume of the second compensating cylinder is connected to the second pressure line.

Each of the compensating cylinders may advantageously have in each case one compression volume, with the compression volume of the first compensating cylinder being connected to the second pressure line and with the compression volume of the second compensating cylinder being connected to the first pressure line. In this way, the device for pressure compensation can be better adapted to different pressure configurations in the working chambers. Cavitation can be even more reliably prevented.

The device for pressure compensation may be further improved if in each case one piston is arranged under the load of the elastic force store of each compensating cylinder, which piston delimits the compensating volume of the respective compensating cylinder.

It is preferable for in each case to have one stop for the respective piston and provided in each compensating cylinder such that the maximum expansion of the elastic force store arranged in the respective compensating cylinder is limited. In this way, the device for pressure compensation can be adapted in a particularly simple and reliable manner to the working chambers of the hydraulic oscillating motor.

The device for pressure compensation may advantageously be configured such that, at maximum expansion of the elastic force store of one of the compensating cylinders, the pressure line connected to the compensating volume of the compensating cylinder is closed off by the piston of the compensating cylinder. In this way, in particular the robustness of the hydraulic device is increased.

The device for pressure compensation may preferably be configured such that an end position damping device is provided in the compensating cylinders for at least one of the end positions of the respective piston. Such an end position damping device, which may for example be of mechanical or hydraulic design, can contribute significantly to increasing the operational reliability of the device for pressure compensation.

The elastic force stores may expediently be configured as spring elements. In this way, a robust device for pressure compensation is provided which is particularly reliable in continuous operation and which is characterized by short reaction times.

To provide a particularly robust configuration for the device for pressure compensation, it may be advantageous for the spring element of the first compensating cylinder to be arranged in the compression volume of the first compensating cylinder, and for the spring element of the second compensating cylinder to be arranged in the compression volume of the second compensating cylinder.

It is advantageously possible for in each case one stop for the respective piston to be provided in the compression volume of each compensating cylinder, in such a way that the maximum compression of the spring element arranged in the respective compensating cylinder is limited. The wear of the spring element can be considerably reduced in this way. It is possible to prevent a so-called 'blocking' of the spring element.

It may be expedient for one or more first working chambers of the hydraulic oscillating motor to form a first group of working chambers which is connected to the first pressure line, and for one or more second working chambers of the hydraulic oscillating motor to form a second group of working chambers which is connected to the second pressure line.

The device for pressure compensation may advantageously be integrated in the oscillating motor. In this way, a particularly compact arrangement is provided which takes up a small amount of installation space in a motor vehicle.

The device for pressure compensation may advantageously be arranged outside the housing of the oscillating motor. This provides an arrangement which is easy to maintain.

With regard to possible retro-fitting, the device for pressure compensation may expediently be configured as a compact structural unit which may preferably be arranged on the housing of the oscillating motor.

Other features which are considered as characteristic for the invention are set forth in the appended claims.

Although the invention is illustrated and described herein as embodied in a hydraulic oscillating motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Figure 1:
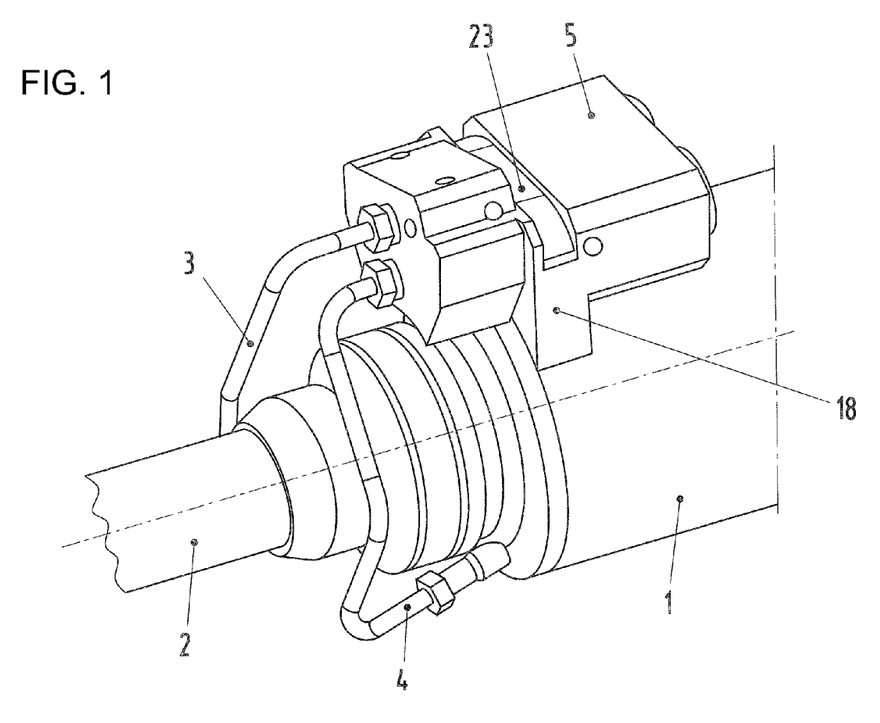
FIG. 1 is a diagrammatic, perspective view of a hydraulic oscillating motor with a device for pressure compensation arranged thereon according to the invention.

Referring now to the figures of the drawing in detail and first, particularly, to FIG. 1 thereof, there is shown a simplified and incomplete illustration of a hydraulic oscillating motor 1 which is connected to a stabilizer 2 of a motor vehicle. The stabilizer 2, which is not illustrated in its entirety in the drawing, is configured as a split stabilizer. A device for pressure compensation 5, which is configured as a compact structural unit 5, is arranged on a housing of the hydraulic assembly. The device for pressure compensation 5 has ports for pressure lines 3, 4. As schematically illustrated in FIGS. 2 to 5, the pressure lines 3, 4 hydraulically connect compensating cylinders 6, 7 of the device for pressure compensation 5 to working chambers 21, 22 or working chamber groups 24, 25 (see FIG. 5) of the oscillating motor 1. The device for pressure compensation 5 is preferably modular and integrated as the structural unit 5 by a holding device 23. In the example shown, the structural unit 5 of the device for pressure compensation has a fastening device 18 by which the structural unit 5 is fastened to the housing of the oscillating motor 1.

FIGS. 2 to 5 show schematic illustrations of the device for pressure compensation in different states. The device for pressure compensation shown in FIGS. 2 to 5 has the compensating cylinders 6, 7. The compensating cylinders 6, 7 are connected via the lines 3, 4 (see also FIG. 1) to the working chambers 21, 22 of the hydraulic oscillating motor 1 shown in part in FIG. 1. A first compensating cylinder 6 has a compensating volume 16 which is hydraulically connected to the first working chamber 21. A compression volume 14 which is hydraulically connected to the second working chamber 22 is provided in the first compensating cylinder 6. The compensating volume 16 and the compression volume 14 are separated from one another by a piston 10. A spring element 8 which is coupled to the piston 10 is arranged in the compression volume 14 of the first compensating cylinder 6. As shown by way of example in FIGS. 2 to 5, that end of the first compensating cylinder 6 which is situated opposite the spring element 8 may form a stop 12 for the piston 10. The second compensating cylinder 7 has a compensating volume 17 which is hydraulically connected to the second working chamber 22. A compression volume 15 of the second compensating cylinder 7 is hydraulically connected to the first working chamber 21. In the second compensating cylinder 7, too, the compensating volume 17 and the compression volume 15 are separated from one another by a piston 11, with the piston 11 being coupled to a spring element 9 which is arranged in the compression volume 15. In the exemplary drawings, that end of the second compensating cylinder 7 which is situated opposite the spring element 9 forms a stop 13 for the piston 11. The stop 12 defines the minimum expansion of the compensating volume 16. The same applies to the stop 13 with regard to the compensating volume 17. Even if the arrangement shown is particularly robust, it is may be expedient for the stops 12, 13 to be arranged differently than is illustrated in the example.

Figure 2:
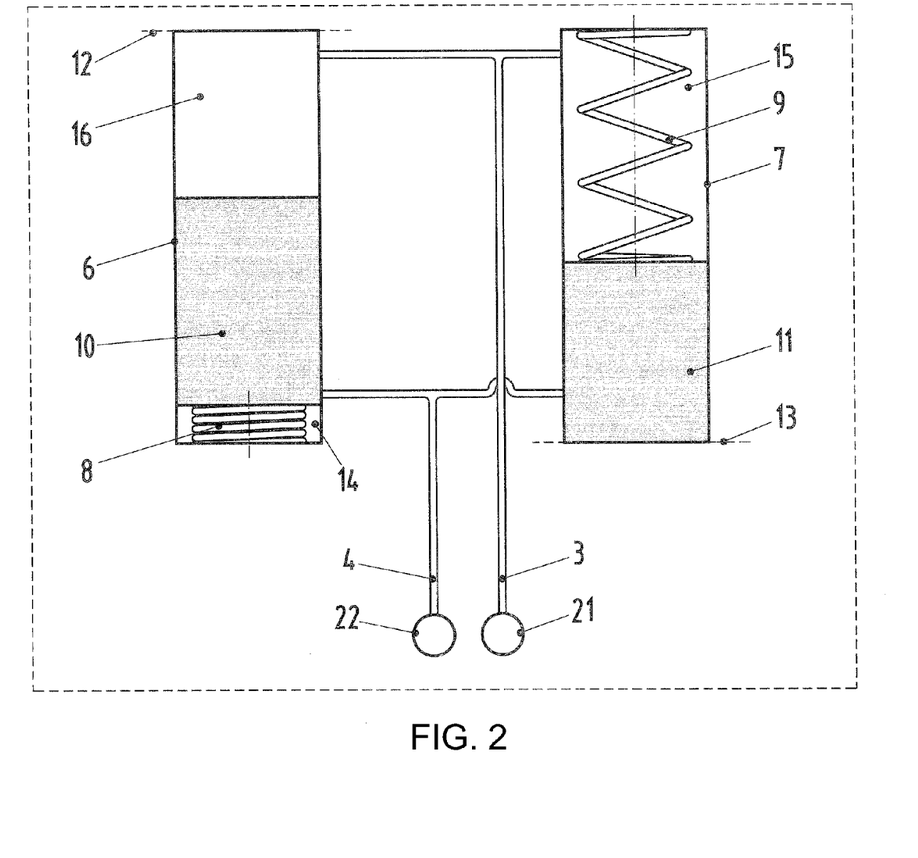
FIG. 2 is an illustration showing compensating cylinders with pressure in a first working chamber.

FIG. 2 shows a state of the device for pressure compensation in which pressure is prevailing in the first working chamber 21. As already stated, the working chamber 21 is hydraulically connected to the compensating volume 16 of the first compensating cylinder 6. Accordingly, the compensating volume 16 is expanded and the spring element 8, which is assigned to the compensating volume 16, of the first compensating cylinder 6 is compressed. The compensating volume 16 of the first compensating cylinder 6 is delimited by the piston 10 which is under the load of the spring element 8. In the state illustrated in FIG. 2, on account of the pressure prevailing in the first working chamber 21, the piston 10 is remote from the stop 12, with the spring element 8 compressed. The compression volume 15 of the second compensating cylinder 7 can be expanded no further than is illustrated in FIG. 2, since in the state shown in FIG. 2, the piston 11 is situated at the stop 13 and therefore a further expansion of the spring element 9 is delimited. In the state shown in FIG. 2, the piston 11 closes off the opening of the second compensating cylinder 7 to the line 4.

The second compensating cylinder 7 and the line 4 are preferably configured and connected to one another such that the movement of the piston 11 to its end position illustrated in FIG. 2 is hydraulically dampened. Here, the arrangement may be configured such that a thin oil cushion (not illustrated in any more detail in the drawing) is formed between the piston 11 and the stop 13 in the end position of the piston 11 shown in FIG. 2. In the example shown, the stop 13 is formed by the wall of the second compensating cylinder 7.

In the state of the device for pressure compensation illustrated in FIG. 2, the spring element 8 is compressed to a maximum extent. In the state shown, the piston 10 of the first compensating cylinder 6 closes off the opening of the first compensating cylinder 6 to the line 4. It is also advantageous for an end position damping device to be provided for the end position of the piston 10 shown here.

Figure 3:
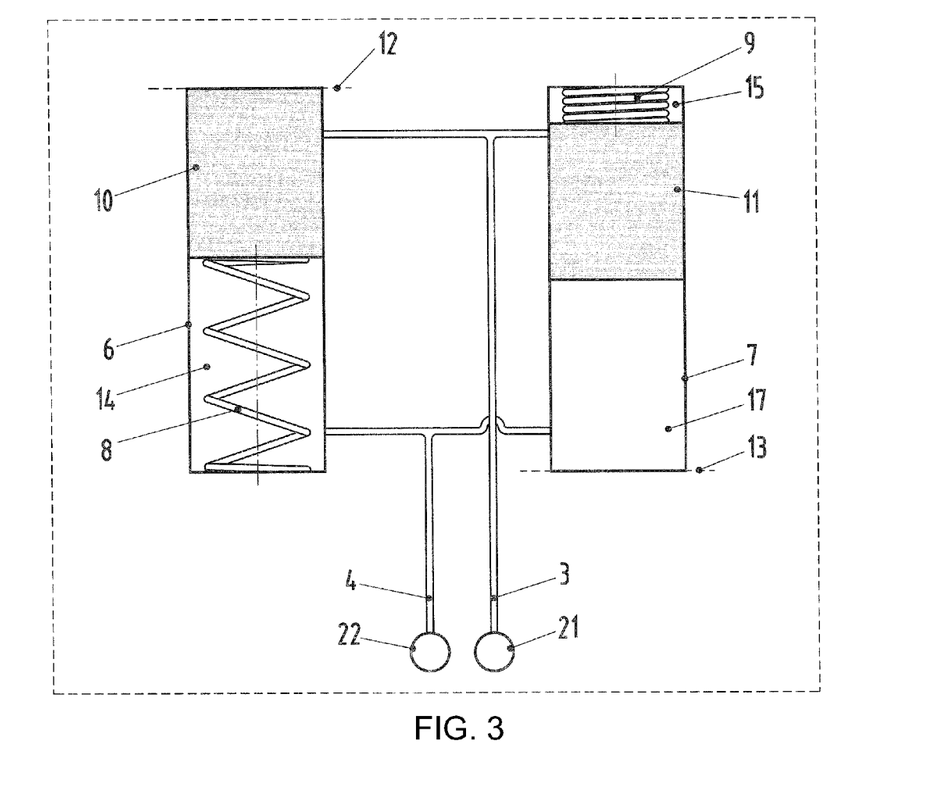
FIG. 3 is an illustration showing the compensating cylinders with pressure in a second working chamber.

In the state shown in FIG. 3, pressure is prevailing in the second working chamber 22. Correspondingly, the compression volume 15 of the second compensating cylinder 7 is compressed and the compensating volume 17 of the second compensating cylinder 7 is expanded. The piston 10 of the first compensating cylinder 6 with the spring element 8 is situated at the stop 12.

The first compensating cylinder 6 and the line 3 are preferably configured and connected to one another in such a way that the movement of the piston 10 to its end position illustrated in FIG. 3 is hydraulically damped. Here, the arrangement may be configured such that a thin oil cushion (not illustrated in any more detail in the drawing) is formed between the piston 10 and the stop 12 in the end position of the piston 10 shown in FIG. 3. In the example shown, the stop 12 is formed by the wall of the second compensating cylinder 7.

In the state of the device for pressure compensation illustrated in FIG. 3, the spring element 9 is compressed to a maximum extent. In the state shown, the piston 11 of the second compensating cylinder 7 closes off the opening of the second compensating cylinder 7 to the line 3. It is also advantageous for an end position damping device to be provided for the end position of the piston 11 shown here.

Alternatively or in addition to the hydraulic end position damping devices described in conjunction with FIGS. 2 and 3, it is for example possible for a mechanical end position damping device to be provided.

Figure 4:
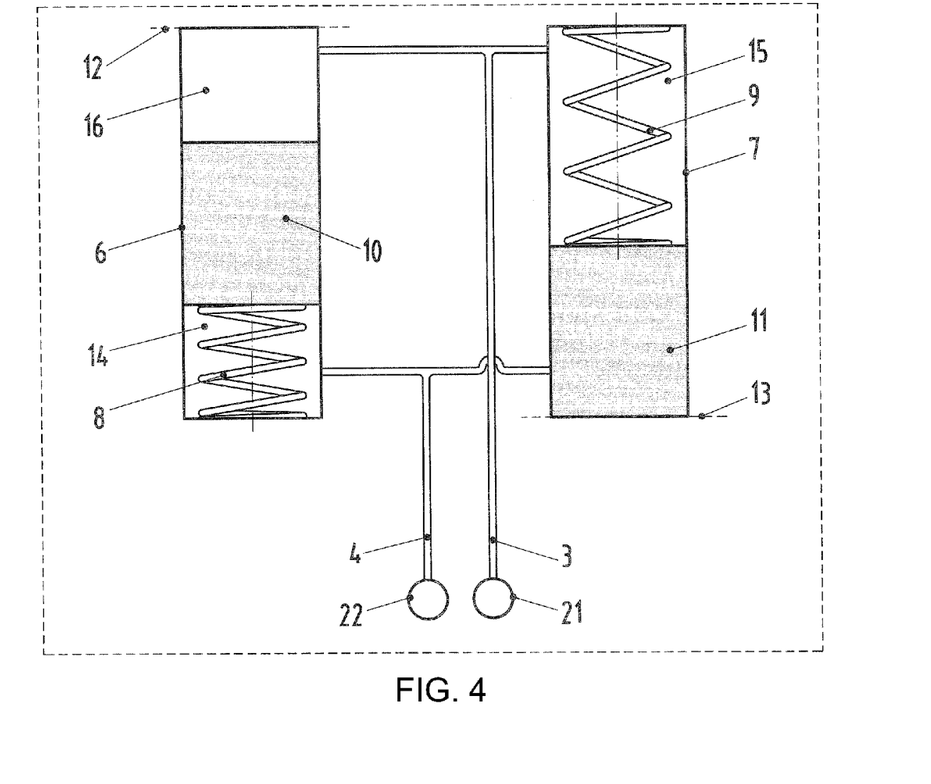
FIG. 4 is an illustration showing the compensating cylinder with a vacuum in the second working chamber.

FIG. 4 shows the state of the device for pressure compensation with a vacuum in the second working chamber 22. The compression volume 14 of the first compensating cylinder 6 is correspondingly reduced. In the state shown by way of example in FIG. 4, the spring element 8 is compressed to a lesser extent than in the state illustrated in FIG. 2. The piston 11 of the second compensating cylinder 7 with the spring element 9 is situated at the stop 13.

Figure 5:
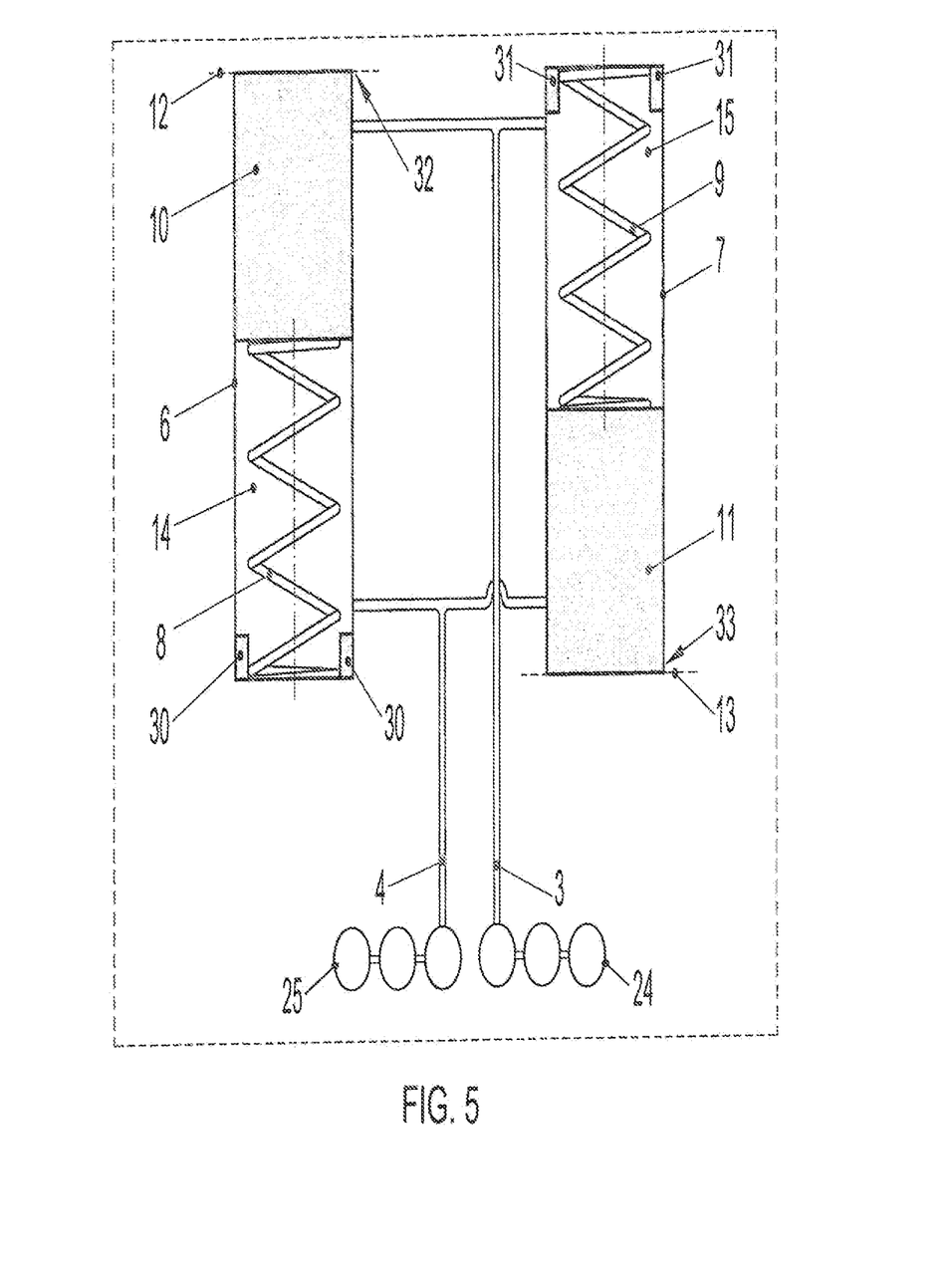
FIG. 5 is an illustration showing the compensating cylinder in an unpressurized state of the working chambers.

FIG. 5 shows the device for pressure compensation 5 in an unpressurized state of the two working chambers 21, 22. In this state, the pistons 10, 11 of the two compensating cylinders 6, 7 assume a fixed position, specifically the initial position of the system. In the initial position, both pistons 10, 11 are situated at the respective stop 12 and 13.

As a result of the provision of in each case one compensating cylinder 6, 7 per working chamber 21, 22, the spring elements can be coordinated extremely precisely with the configuration of the working chambers 21, 22 or working chamber groups and the occurring pressure gradients. Production tolerances in the configuration of the pistons 10, 11 and spring elements 8, 9 can be better controlled. The system according to the invention is extremely robust with regard to any changes in pressure drop which may occur over the service life. The system described above is also relatively insusceptible to occurrences of wear.

Mechanical end stops for the pistons 10, 11 may be provided in each case in the compression volumes 14, 15 of the compensating cylinders 6, 7 in order, at maximum or high compression of the spring element 8, 9 arranged in the respective compression volume 14, 15, to limit the compression of the spring element 8, 9. Such end stops are shown schematically and by way of example as stops 30, 31 in FIG. 5. For better clarity, the stops 30, 31 are illustrated only in FIG. 5. The stop 30 would be active for the spring element 8 in the state illustrated in FIG. 2, and the stop 31 would be active for the spring element 9 in the state illustrated in FIG. 3.

The invention claimed is:

1. A hydraulic oscillating motor, comprising:
pressure lines including a first pressure line and a second pressure line;
a device for pressure compensation having a first compensating cylinder and a second compensating cylinder, each of said first and second compensating cylinders having one compensating volume and one elastic force store for delimiting a respective compensating volume, said compensating volume of said first compensating cylinder being connected to said first pressure line and said compensating volume of said second compensating cylinder being connected to said second pressure line, each of said first and second compensating cylinders having one compression volume, said compression volume of said first compensating cylinder being connected to said second pressure line and said compression volume of said second compensating cylinder being connected to said first pressure line; and
at least two working chambers coupled via said pressure lines to said device for pressure compensation, said at least two working chambers including a first working chamber connected to said first pressure line and a second working chamber connected to said second pressure line.

2. The hydraulic oscillating motor according to claim 1, wherein said device for pressure compensation has pistons with in each case one of said pistons disposed under a load of said elastic force store of each of said compensating cylinders, said piston delimits said compensating volume of a respective one of said compensating cylinders.

3. The hydraulic oscillating motor according to claim 2, further comprising stops, one of said stops provided for each of said pistons and disposed in each of said compensating cylinders such that a maximum expansion of said elastic force store disposed in said respective compensating cylinder is limited.

4. The hydraulic oscillating motor according to claim 2, wherein said device for pressure compensation configured such that, at a maximum expansion of said elastic force store of one of said compensating cylinders, said pressure line connected to said compensating volume of said compensating cylinder is closed off by said piston of said compensating cylinder.

5. The hydraulic oscillating motor according to claim 2, wherein said device for pressure compensation has an end position damping device disposed in said compensating cylinders for at least one of end positions of said respective piston.

6. The hydraulic oscillating motor according to claim 2, wherein said elastic force stores are spring elements.

7. The hydraulic oscillating motor according to claim 6, wherein said spring element of said first compensating cylinder is disposed in said compression volume of said first compensating cylinder, and said spring element of said second compensating cylinder is disposed in said compression volume of said second compensating cylinder.

8. The hydraulic oscillating motor according to claim 7, further comprising stops and in each case one of said stop for said respective piston being provided in said compression volume of each said compensating cylinder, in such a way that a maximum compression of said spring element disposed in said respective compensating cylinder is limited.

9. The hydraulic oscillating motor according to claim 1, wherein:
- at least one of said working chambers being at least one first working chamber forming a first group of working chambers which is connected to said first pressure line; and
- at least one of said working chambers being at least one second working chamber forming a second group of working chambers which is connected to said second pressure line.

10. The hydraulic oscillating motor according to claim 1, wherein said device for pressure compensation being integrated with said compensating cylinders.

11. The hydraulic oscillating motor according to claim 1, further comprising a housing, said device for pressure compensation disposed with said compensating cylinders outside said housing.

12. The hydraulic oscillating motor according to claim 11, wherein said device for pressure compensation is a structural unit which is disposed on said housing.

* * * * *